(12) United States Patent
Coelingh et al.

(10) Patent No.: US 6,622,074 B1
(45) Date of Patent: Sep. 16, 2003

(54) VEHICLE MOTION CONTROL SUBSYSTEM AND METHOD

(75) Inventors: Erik Coelingh, Olofstrop (SE); Jonas Ekmark, Olofstorp (SE); Jan Ryderstam, Halta (SE); Per Olsson, Gotenborg (SE); Per Persson, Gothenburg (SE); Soren Eriksson, Kungalv (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,952

(22) Filed: May 29, 2002

(51) Int. Cl.[7] .................................................. G06F 17/00
(52) U.S. Cl. ............................. 701/48; 701/1; 701/37; 280/5.5; 180/165
(58) Field of Search ................................ 701/1, 48, 37; 280/5.5; 180/118, 119, 165, 167

(56) References Cited

U.S. PATENT DOCUMENTS

| | | | |
|---|---|---|---|
| 4,439,824 A | 3/1984 | Mayer | |
| 4,827,416 A | 5/1989 | Kawagoe et al. | |
| 4,828,283 A | 5/1989 | Ishii et al. | |
| 4,970,645 A | 11/1990 | Adachi et al. | |
| 5,041,978 A | 8/1991 | Nakayama et al. | |
| 5,048,633 A | 9/1991 | Takehara et al. | |
| 5,070,460 A | 12/1991 | Yasuno | |
| 5,101,355 A | 3/1992 | Wada et al. | |
| 5,159,555 A | 10/1992 | Wada | |
| 5,173,858 A | 12/1992 | Wada et al. | |
| 5,342,079 A | 8/1994 | Buma | |
| 5,351,776 A | 10/1994 | Keller et al. | |
| 5,369,584 A | 11/1994 | Kajiwara | |
| 5,408,411 A | * 4/1995 | Nakamura et al. | ............ 701/48 |
| 5,446,662 A | 8/1995 | Kojima et al. | |
| 5,485,892 A | 1/1996 | Fujita | |
| 5,513,108 A | 4/1996 | Kishimoto et al. | |
| 5,794,735 A | 8/1998 | Sigl | |
| 5,822,709 A | 10/1998 | Fujita | |
| 5,927,421 A | 7/1999 | Fukada | |
| 5,991,675 A | 11/1999 | Asanuma | |
| 6,038,505 A | 3/2000 | Probst et al. | |
| 6,098,007 A | 8/2000 | Fritz | |
| 6,154,688 A | 11/2000 | Dominke et al. | |
| 6,161,071 A | 12/2000 | Shuman et al. | |
| 6,192,307 B1 | 2/2001 | Okamoto et al. | |

* cited by examiner

*Primary Examiner*—Gertrude Arthur
(74) *Attorney, Agent, or Firm*—Frank A. MacKenzie

(57) ABSTRACT

A vehicle control system (10) including a vehicle motion control subsystem (12) that has an input receiving an intended driving demand (14) and a plurality of coordinator subsystems (16) for coordinating actuators of the vehicle. The vehicle motion control subsystem (12) communicates with the coordinator subsystems (16) to determine whether a single coordinator subsystem (16) can carry out the intended driving demand (14). The vehicle motion control subsystem (12) will distribute demand signals among one or more of the coordinator subsystems (16) to allow the vehicle to implement the intended driving demand (14).

20 Claims, 9 Drawing Sheets

VEHICLE MOTION CONTROL SUBSYSTEM AND METHOD

BACKGROUND OF INVENTION

The present invention relates to a control system, and in particular to a control system for a motor vehicle.

Control systems for motor vehicles command various actuators of the motor vehicles to perform certain tasks. Examples of control systems include traction control systems, anti-lock braking systems and stability control systems. Each of these control systems has a particular function that is carried out when certain information is sensed by the vehicle. For example, the anti-lock braking system will prevent the tires of the vehicle from locking during braking. Furthermore, vehicle control systems coordinate some or all of the actuators of the vehicle to produce a desired vehicle movement or procedure.

Heretofore, total control structures for motor vehicles have included coordinating elements which convert a command from a higher hierarchical level into commands for elements of a lower hierarchical level. The contents of the commands, which are transmitted from above to below in the hierarchical structure, define physical variables that determine the interfaces between the individual hierarchical levels. The command flow is only from a higher hierarchical level to a lower hierarchical level. U.S. Pat. Nos. 5,351,776 and 6,154,688 disclose control systems wherein the command flows only from the higher hierarchical level to the lower hierarchical level. However, the aforementioned control systems do not revise their commands to the lower hierarchical levels when the actuators being commanded by the lower hierarchical levels cannot carry out the commands.

Accordingly, an apparatus solving the aforementioned disadvantages and having the aforementioned advantages is desired.

SUMMARY OF INVENTION

One aspect of the present invention is to provide a method of controlling a vehicle with a vehicle motion control subsystem. The method includes the step of inputting an intended driving demand to the vehicle motion control subsystem, with the intended driving demand requesting a vehicle behavior modification. The method also includes the steps of inputting vehicle state measurements into a first coordinator subsystem, determining first capabilities of the first coordinator subsystem with regard to the vehicle state measurements, and outputting a first capability signal from the first coordinator subsystem to the vehicle motion control subsystem, with the first capability signal communicating the first capabilities of the first coordinator subsystem. The method further includes the steps of calculating a first demand signal and at least one of a second demand signal and a third demand signal, and outputting the first demand signal from the vehicle motion control subsystem to the first coordinator subsystem and the at least one of the second demand signal and the third demand signal to at least one of a second coordinator subsystem and a third coordinator subsystem. Both the first demand signal and the at least one of the second demand signal and the third demand signal are calculated according to the first capabilities of the first coordinator subsystem. The first demand signal and the at least one of the second demand signal and the third demand signal provide directions for the first coordinator subsystem and the at least one of the second coordinator subsystem and the third coordinator subsystem, respectively, to perform the vehicle behavior modification of the intended driving demand.

Another aspect of the present invention is to provide a vehicle control system. The vehicle control system includes a vehicle motion control subsystem having a system input and a system output, with the system input communicating an intended driving demand to the vehicle motion control subsystem and the intended driving demand requesting a vehicle behavior modification. The vehicle control system also includes a first coordinator subsystem having a first subsystem input and a first subsystem output, with the first subsystem input receiving vehicle state measurements. The vehicle control system further includes at least one of a second coordinator subsystem having a second subsystem input and a third coordinator subsystem having a third subsystem input. The first coordinator subsystem determines first capabilities of the first coordinator subsystem with regard to the vehicle state measurements. The first subsystem output of the first coordinator subsystem communicates the first capabilities of the first coordinator subsystem to the system input of the vehicle motion control subsystem. The vehicle motion control subsystem calculates a first demand signal and at least one of a second demand signal and a third demand signal, both the first demand signal and the at least one of the second demand signal and the third demand signal being calculated according to the first capabilities of the first coordinator subsystem. The vehicle motion control subsystem outputs the first demand signal to the first coordinator subsystem and at least one of the second demand signal and the third demand signal to at least one of the second subsystem input and the third subsystem input of the second coordinator subsystem and the third coordinator subsystem, respectively. The first demand signal and the at least one of the second demand signal and the third demand signal provide directions for the first coordinator subsystem and the at least one of the second coordinator subsystem and the third coordinator subsystem, respectively, to perform the vehicle behavior modification of the intended driving demand.

Yet another aspect of the present invention is to provide a method of controlling a vehicle with a vehicle motion control subsystem. The method includes inputting an intended driving demand to the vehicle motion control subsystem, with the intended driving demand requesting a vehicle behavior modification. The method also includes the step of determining first capabilities of a first coordinator subsystem, second capabilities of a second coordinator subsystem, and third capabilities of a third coordinator subsystem. The method further includes the step of outputting a first capability signal from the first coordinator subsystem to the vehicle motion control subsystem, a second capability signal from the second coordinator subsystem to the vehicle motion control subsystem and a third capability signal from the third coordinator subsystem to the vehicle motion control subsystem, with the first capability signal communicating the first capabilities of the first coordinator subsystem, the second capability signal communicating the second capabilities of the second coordinator subsystem and the third capability signal communicating the third capabilities of the third coordinator subsystem. The method also includes calculating at least one demand signal with the vehicle motion control subsystem according to at least one of the first capabilities of the first coordinator subsystem, the second capabilities of the second coordinator subsystem and the third capabilities of the third coordinator subsystem. The method further includes the step of outputting the at least one demand signal from the vehicle motion control subsystem to at least one coordinator subsystem. The at least one demand signal provides directions for the at least one coordinator subsystem to perform the vehicle behavior modification of the intended driving demand.

Accordingly, the vehicle control system provides for enhanced redistribution of functionality to avoid a loss of performance of the vehicle. The vehicle control system is easy to implement, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
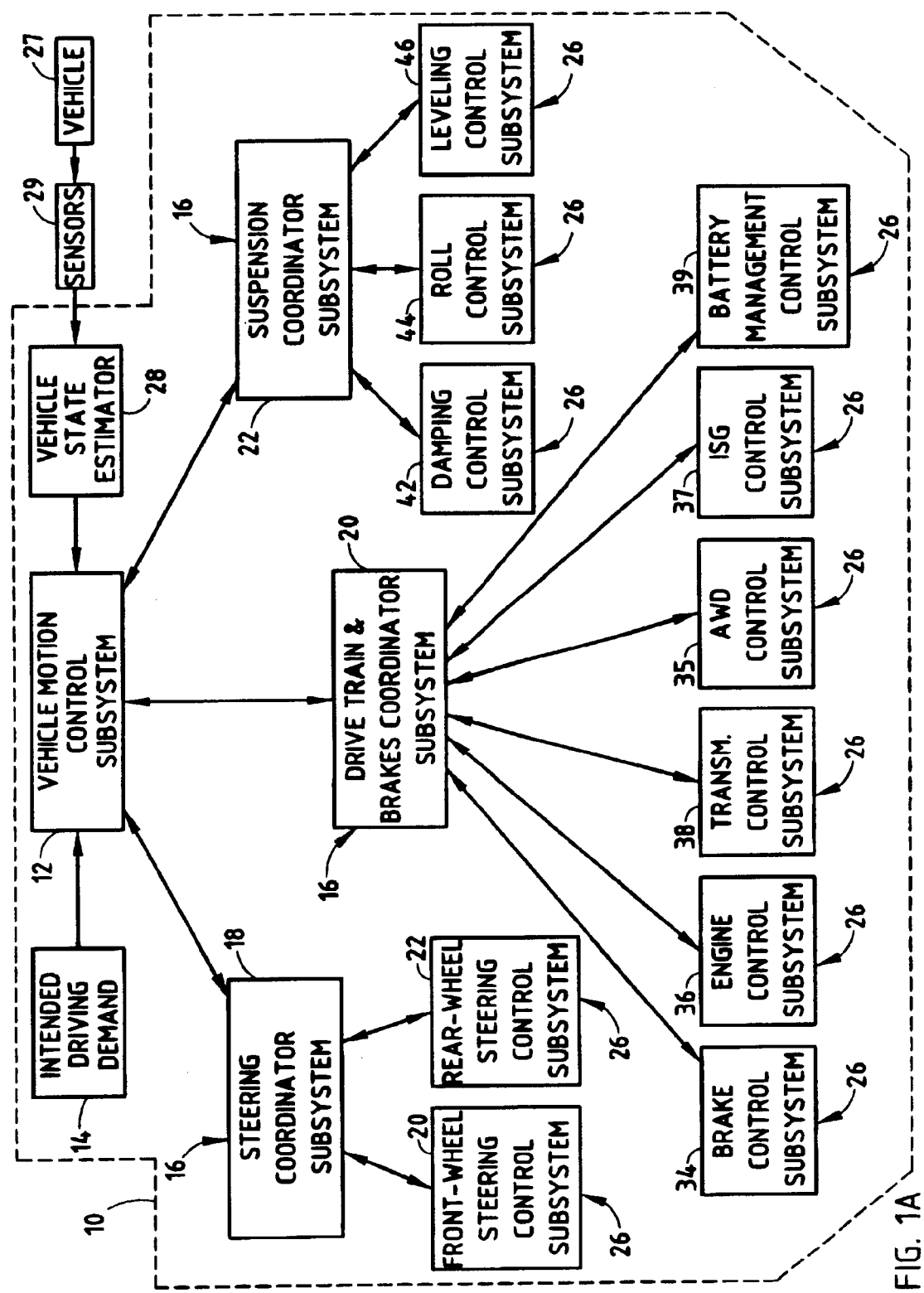
FIGS. 1A and 1B are schematics of a vehicle control system of the present invention.

Referring to FIG. 1A, reference number 10 generally designates a first portion of a vehicle control system embodying the present invention. In the illustrated example, the first portion 10 of the vehicle control system includes a vehicle motion control subsystem 12 that has an input receiving an intended driving demand 14 and a plurality of coordinator subsystems 16 for coordinating actuators of the vehicle. The vehicle motion control subsystem 12 communicates with the coordinator subsystems 16 to determine the capabilities of the coordinator subsystems 16 for carrying out the intended driving demand 14. The vehicle motion control subsystem 12 will distribute demand signals among one or more of the coordinator subsystems 16 to allow the vehicle to implement the intended driving demand 14.

In the illustrated example, the vehicle control system comprises a hierarchy including five tiers of control levels for controlling vehicle behavior modifications. FIG. 1A illustrates the input from the top two control tiers and the bottom three control tiers. The third level control tier includes the vehicle motion control subsystem 12 for overall control of the six degrees of motion of the vehicle. The top two control tiers produce the intended driving demand 14 that is input into the vehicle motion control subsystem 12. The fourth level control tier includes the coordinator subsystems 16. The coordinator subsystems can include a steering coordinator subsystem 18 for controlling steering of the vehicle, a drive train and brakes coordinator subsystem 20 for controlling a drive train and brakes of the vehicle, and a suspension coordinator subsystem 22 for controlling a suspension of the vehicle. All of the coordinator subsystems 16 of the fourth level control tier communicate with the vehicle motion control subsystem 12. The fifth level control tier includes actuator control subsystems 26 for controlling individual actuators of the steering coordinator subsystem 18, the drive train and brakes coordinator subsystem 20, and the suspension coordinator subsystem 22. Each actuator control subsystem 26 communicates with one of the coordinator subsystems 16.

Figure 1B:
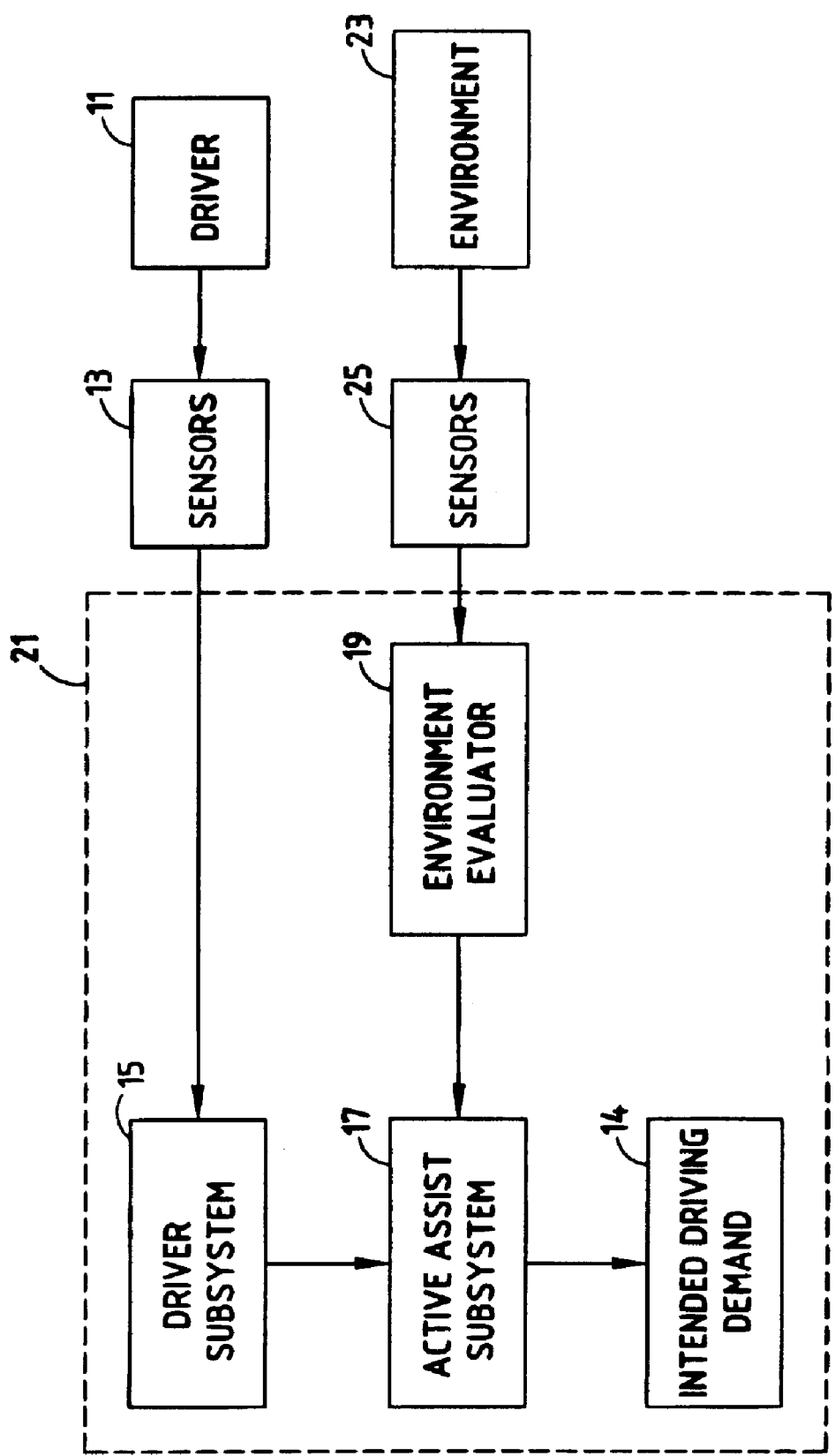

The illustrated vehicle motion control subsystem 12 receives inputs from a driver 11 of the vehicle and active assist programs for the vehicle and divides the inputs into individual commands for each of the coordinator subsystems 16. As seen in FIG. 1B, a second portion 21 of the vehicle control system comprises a driver subsystem 15 and an active assist subsystem 17 defining the top two control tiers of the vehicle control system. A plurality of sensors 13 for sensing the driver inputs directly from the driver 11 of the vehicle input the driver inputs into the driver subsystem 15. The driver inputs are preferably read from the desired vehicle movement or behavior modification as specified by the driver 11 of the vehicle as measured through driver controls. The driver inputs can include the position of a brake pedal as measured through a sensor, the position of an acceleration pedal as measured through a sensor, the position of a steering wheel as measured through a sensor, the gear range selection of the vehicle (e.g., gear range D telling the transmission to use 1st, 2nd, 3rd, 4th and 5th gear, gear range 2 telling the transmission to use 1st and 2nd gear, etc.), etc. The driver subsystem 15 forms the first level control tier of the control hierarchy. All of the driver inputs are preferably input into the driver subsystem 15 at the first level control tier of the control hierarchy and are thereafter transferred to the active assist subsystem 17 comprising the second level control tier of the control hierarchy.

In the illustrated example, the active assist subsystem 17 of the second level control tier of the control hierarchy receives the output from the driver subsystem 15 and, in certain situations, combines the output from the driver subsystem 15 with outputs from active assist programs of the vehicle to form the intended driving demand 14. Active assist programs can include active cruise control, active collision mitigation, lane keeping aid and intelligent speed adaptation programs used by the vehicle. It is contemplated that other active assist programs can also be used. The active assist subsystem 17 of the control hierarchy receives inputs from an environment evaluator 19 that interprets measurement of the environment 23 around the vehicle measured through sensors 25. The inputs from the environment evaluator are environmental data. For example, the environment evaluator 19 will detect objects and recognize the terrain around the vehicle for helping to determine the distance of a vehicle in front of the measuring vehicle for use in determining if the vehicle should slow down while using the active cruise control to maintain a safe distance behind a leading vehicle or for determining lane markings. The environment evaluator 23 can also determine the location of the vehicle as measured by a global positioning satellite (GPS). The active assist programs have an on setting wherein the active assist program outputs at least one active input and an off setting where the active assist program does not output any signals. If no active assist programs are running (i.e., in an off setting) or if the driver of the vehicle overrules all inputs from the active assist programs, the intended driving demand 14 is derived from the driver inputs. If one or more active assist programs are running (i.e., in an on setting) and the driver of the vehicle does not overrule the inputs from the active assist programs, the intended driving demand comprises a combination of the commands from the driver inputs and the inputs from the active assist programs or the inputs from the active assist programs alone. It is also contemplated that the intended driving demand 14 as described above can be input into the vehicle motion control subsystem 12 from each driver control and active assist program separately if only the bottom three control tiers of the vehicle control system are used in a vehicle. Each of the driver inputs and the active assist programs as described above are well known to those skilled in the art.

The vehicle motion control subsystem 12 (FIG. 1A) receives the intended driving demand 14 from the second portion 21 of the vehicle control system. In the illustrated example, the vehicle motion control subsystem 12 will not be able to determine whether the intended driving demand 14 is derived from the driver inputs and/or the active inputs. The vehicle motion control subsystem 12 also receives inputs from sensors 29 on the vehicle 27 relaying vehicle state measurements of the vehicle 27. The vehicle state measurements of the illustrated invention inputted into the vehicle motion control subsystem 12 include the physical characteristics of the vehicle as determined by a vehicle state estimator 28 using the readings of the sensors 29 measuring the characteristics of the vehicle 27. The vehicle state measurements can include the traction of the vehicle, the motion of the vehicle in six directions (e.g., longitudinal, lateral, vertical (heave), yaw, roll, and pitch), etc. All of the vehicle state measurements define a vehicle state of the vehicle. The vehicle motion control subsystem 12 receives the vehicle state measurements in order to determine what changes must be made to the vehicle to accomplish the intended driving demand 14. The vehicle state measurements are also transferred to other control tiers as discussed below. All of the vehicle state measurements, methods of sensing the vehicle, and equipment and methods used to determine the vehicle state measurements as described directly above are well known to those skilled in the art.

In the illustrated example, the coordinator subsystems 16 communicate with the vehicle motion control subsystem 12 for receiving inputs for carrying out the intended driving demand 14. The coordinator subsystems 16 preferably include the steering coordinator subsystem 18, the drive train and brakes coordinator subsystem 20, and the suspension coordinator subsystem 22. Each of the coordinator subsystems 16 include an input that receives a signal from the vehicle motion control subsystem 12 commanding the coordinator subsystem 16 to implement a particular vehicle behavior modification. Therefore, the steering coordinator subsystem 18 receives a steering behavior modification demand signal conveying a steering behavior modification demand from the vehicle motion control subsystem 12. The steering behavior modification demand instructs the steering coordinator subsystem 18 to make a steering behavior modification (e.g., steer the vehicle in a certain lateral direction). Likewise, the drive train and brakes coordinator subsystem 20 receives a drive train and brakes behavior modification demand signal conveying a drive train and brakes behavior modification demand from the vehicle motion control subsystem 12. The drive train and brakes behavior modification demand instructs the drive train and brakes coordinator subsystem 20 to make a drive train and brakes behavior modification (e.g., move the vehicle in a certain longitudinal direction). Moreover, the suspension coordinator subsystem 22 receives a suspension behavior modification demand signal conveying a suspension behavior modification demand from the vehicle motion control subsystem 12. The suspension behavior modification demand instructs the suspension coordinator subsystem 22 to make a suspension behavior modification (e.g., manipulate the vehicle in a certain vertical (heave) direction). Each behavior modification demand of the coordinator subsystems 16 can also affect the motion of the vehicle in other directions. For example, the steering coordinator subsystem 18 can affect the yaw motion of the vehicle by turning the front wheels of the vehicle and can affect the roll motion of the vehicle by turning (thereby causing the side of the vehicle with the smaller turning radius to roll upward). As additional examples, the drive train and brakes coordinator subsystem 20 can affect the yaw motion by braking only one side of the vehicle and the suspension coordinator subsystem 22 can affect the longitudinal motion of the vehicle by altering the suspension of the vehicle to provide for improved traction. Furthermore, as discussed in more detail below, each coordinator subsystem 16 also provides an output to the vehicle motion control subsystem 12 for communicating capabilities of the coordinator subsystems 16. The capabilities of the coordinator subsystems 16 are the combination of the actuator control subsystems 26 communicating with an associated coordinator subsystem 16. Although three coordinator subsystems 16 are shown and described herein, it is contemplated that any number of coordinator subsystems 16 can be used in the vehicle control system.

Once the illustrated coordinator subsystems 16 receive their instructions from the vehicle motion control subsystem 12, the coordinator subsystems 16 delegate responsibilities for carrying out the instruction from the vehicle motion control subsystem 12 and output instructions into the actuator control subsystems 26. In the illustrated embodiment, the steering coordinator subsystem 18 apportions the steering behavior modification demand from the vehicle motion control subsystem 12 to a front-wheel steering control subsystem 30 and a rear wheel steering control subsystem 32. The front-wheel steering control subsystem 30 and the rear wheel steering control subsystem 32 primarily steer the vehicle in a certain lateral direction as well as affecting motion of the vehicle in other directions.

The illustrated drive train and brakes coordinator subsystem 20 apportions the drive train and brakes behavior modification demand from the vehicle motion control subsystem 12 to a brake control subsystem 34 controlling brakes of the vehicle, an engine control subsystem 36 controlling an engine of the vehicle, a transmission control subsystem 38 controlling a transmission of the vehicle, an all-wheel drive (AWD) control subsystem 35, an integrated starter/generator (ISG) control subsystem 37 controlling an integrated starter/generator and a battery management control subsystem 39 controlling a battery. The brake control subsystem 34, the engine control subsystem 36, the transmission control subsystem 38, the all-wheel drive (AWD) control subsystem 35, the integrated starter/generator (ISG) control subsystem 37 and the battery management control subsystem 39 primarily move the vehicle in the longitudinal direction as well as affect motion of the vehicle in other directions.

The illustrated suspension coordinator subsystem 22 apportions the suspension behavior modification demand from the vehicle motion control subsystem 12 to a damping control subsystem 42 controlling damping of the suspension of the vehicle, a roll control subsystem 44 controlling roll of the vehicle and a leveling control subsystem 46 controlling a level of the vehicle. The damping control subsystem 42 controlling damping of the suspension of the vehicle, the roll control subsystem 44 and the leveling control subsystem 46 primarily move the vehicle in the heave direction as well as affect motion of the vehicle in other directions. The actuator control subsystems 26 listed above are illustrative, and not exhaustive, of the actuator control subsystems 26 that can be used in the vehicle control system. For example, a tire pressure control subsystem functionally located below the suspension coordinator subsystem 22 can also be employed.

Figure 2:
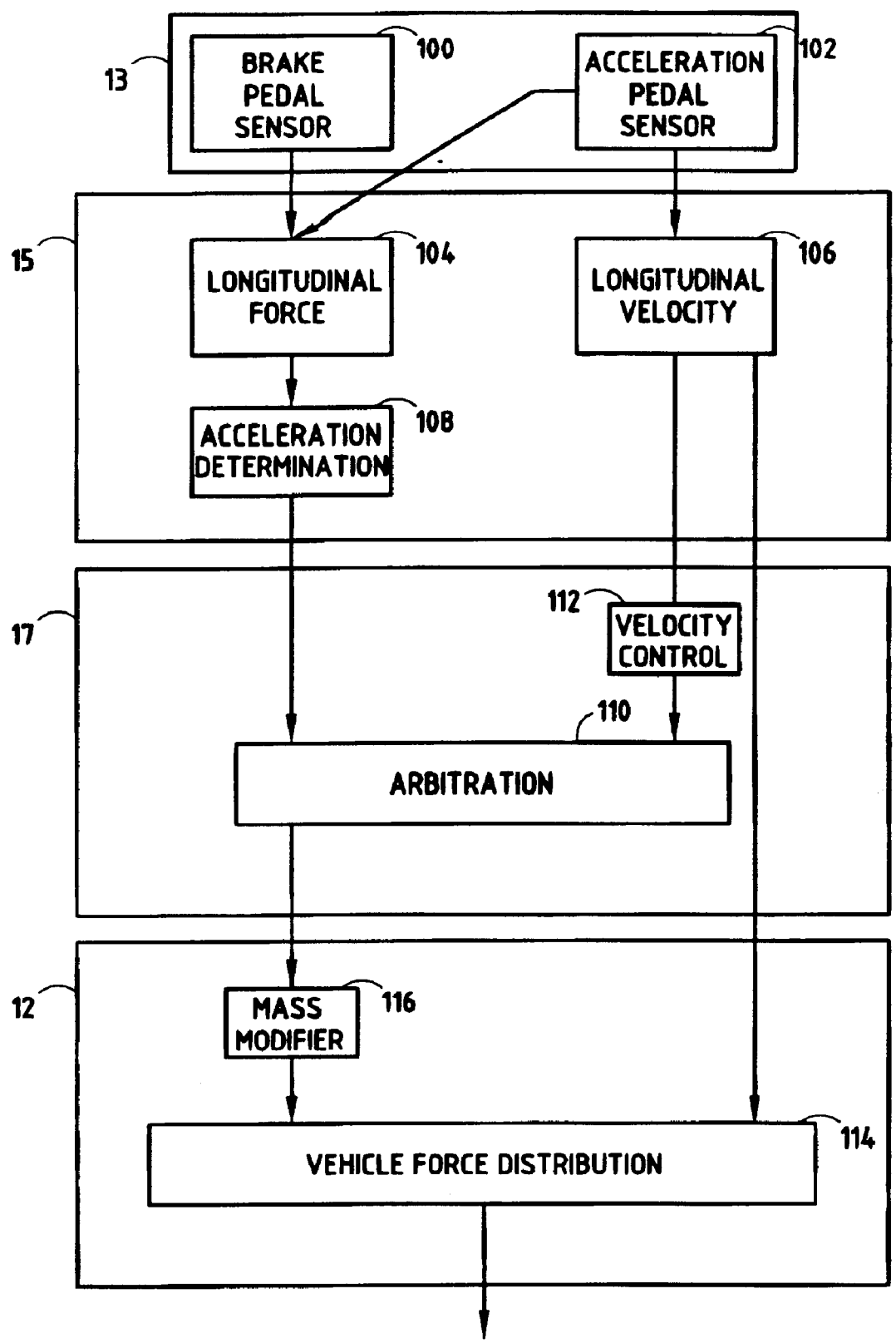
FIG. 2 is a schematic of a portion of the vehicle control system of the present invention showing the internal processes for developing a drive train and brakes behavior modification demand signal.

FIG. 2 is a schematic of a portion of the vehicle control system of the present invention showing the internal processes for developing the drive train and brakes behavior modification demand signal. First, the driver inputs on a brake pedal and an acceleration pedal are measured through a brake pedal sensor 100 and an acceleration pedal sensor 102, respectively. The driver input is measured on the brake pedal sensor 100 and interpreted in the driver subsystem 15 as at least one of the force of the pressure on the brake pedal, the travel distance of the brake pedal and the activation (depression without measuring the force) of the brake pedal. The brake pedal sensor 100 transfers this information as a braking force request (i.e., deceleration of the mass of the vehicle) to a longitudinal force block 104 of the driver subsystem 15.

The driver input is measured on the acceleration pedal sensor 102 as the travel distance or position of the acceleration pedal. The acceleration pedal sensor 102 will transfer this driver input as either a requested acceleration or a requested velocity, depending on the driving mode of the vehicle. The driving mode of the vehicle can be determined by a switch in the vehicle. In a first mode, if the vehicle is in a low speed mode as set by a switch or if a cruise control switch is activated, the acceleration pedal sensor 102 will transfer a longitudinal velocity request to a longitudinal velocity block 106. The second mode of the vehicle encompasses every other state of the vehicle not in the first mode. In the second mode, the acceleration pedal sensor 102 will transfer a traction force request (i.e., acceleration of the mass of the vehicle) to the longitudinal force block 104.

In the illustrated example, the longitudinal force block 104 will transfer the force request (traction or braking) to an acceleration determination block 108 wherein the force request of the vehicle is divided by the nominal mass of the vehicle (i.e., static, unloaded mass of the vehicle) to obtain a mass independent acceleration request. The mass independent acceleration request is transferred to a first arbitration block 110 in the active assist subsystem 17. The longitudinal velocity block 106 transfers the longitudinal velocity request to a velocity control block 112 in the active assist subsystem 17 if the longitudinal velocity request comes from the cruise control or to a vehicle force distribution block 114 in the vehicle motion control subsystem 12 (through the active assist subsystem 17) if the longitudinal velocity request comes from the low speed mode. Preferably, the driver subsystem 15 and the active assist subsystem 17 communicate to each other through one node such that all information coming from the driver subsystem 15 is transferred together to the active assist subsystem 17. Additionally, only the driver subsystem 15 has to be altered if driver inputs are added or removed from communicating with the vehicle control system.

The illustrated active assist subsystem 17 includes the first arbitration block 110 and the velocity control block 112. The velocity control block 112 includes the active assist programs that affect longitudinal motion of the vehicle. When the velocity control block 112 receives the longitudinal velocity request, the velocity control block 112 will compare the longitudinal velocity request, possibly modified by a radar signal (i.e., environmental data) from the environment evaluator 19 if adaptive cruise control or collision mitigation is operating, to an actual velocity of the vehicle (as measured by the sensors 29 on the vehicle 27 and the vehicle state estimator 28 and transferred from the vehicle motion control subsystem 12 to the active assist subsystem 17). With the comparison, the velocity control block 112 can determine the required acceleration of the vehicle to achieve the velocity of the longitudinal velocity request. The required acceleration (i.e., at least one active input) of the vehicle is then transferred from the velocity control block 112 to the first arbitration block 110.

The required acceleration of the vehicle from the vehicle control block 112 (if applicable) is compared to the requested acceleration from the acceleration determination block 108 in the first arbitration block 110 to determine if the driver wants to overrule the required acceleration from the velocity control block 112 by pressing the acceleration pedal or the brake pedal (as determined by the occurrence of the requested acceleration). For example, the driver of the vehicle may want to be closer to a preceding vehicle that the adaptive cruise control is programmed to allow. The first arbitration block 110 will then send out a desired acceleration to a mass modifier block 116 in the vehicle motion control subsystem 12. The desired acceleration will be the requested acceleration if the velocity control block 112 is not outputting a signal (i.e., the at least one active input) or if the first arbitration block 110 determines that the driver wants to overrule the required acceleration (i.e., the at least one active input). Otherwise, the first arbitration block 110 will send out the required acceleration as transferred from the velocity control block 112. Therefore, the drive train and brake portion of the intended driving demand will be derived from the at least one driver input and the at least one active input if the at least one active assist program is in the on setting and the driver of the vehicle does not override the at least one active input. Otherwise, the drive train and brake portion of the intended driving demand will be the at least one driver input. Preferably, the active assist subsystem 17 and the vehicle motion control subsystem 12 communicate to each other through one node such that all information coming from the active assist subsystem 17 is transferred together to the vehicle motion control subsystem 17. Additionally, only the active assist subsystem 17 has to be altered if active assist programs are added or removed from the vehicle control system.

In the illustrated example, the vehicle motion control subsystem 12 will receive the requested acceleration or the required acceleration from the first arbitration block 110 of the active assist subsystem 17 or the requested velocity from the longitudinal velocity block 106 of the driver subsystem 15 (via the active assist subsystem 17). The requested acceleration, the required acceleration and/or the requested velocity form a longitudinal movement portion of the intended driving demand 14. The vehicle motion control subsystem 12 receives the requested acceleration or the required acceleration in the mass modifier block 116. The mass modifier block 116 converts the requested acceleration or the required acceleration by the actual mass (one of the vehicle state measurements) of the vehicle as reported to the vehicle motion control subsystem 12 through the vehicle state estimator 28 to form a desired longitudinal force. The mass modifier block 116 then passes the desired longitudinal force to the vehicle force distribution block 114. The vehicle force distribution block 114 then modifies the desired longitudinal force or velocity request into a wheel torque request or wheel velocity request, respectively, for each of the four wheels of the vehicle to be passed on to the drive train and brakes coordinator subsystem 20. The force distribution block 114 will also modify the requested wheel torque or velocity to accomplish non-longitudinal demands of the intended driving demand, such as creating a yaw moment through braking one side of the vehicle (i.e., negative wheel torque). The wheel torque request or the wheel velocity request is the drive train and brakes behavior modification demand signal.

Figure 3:
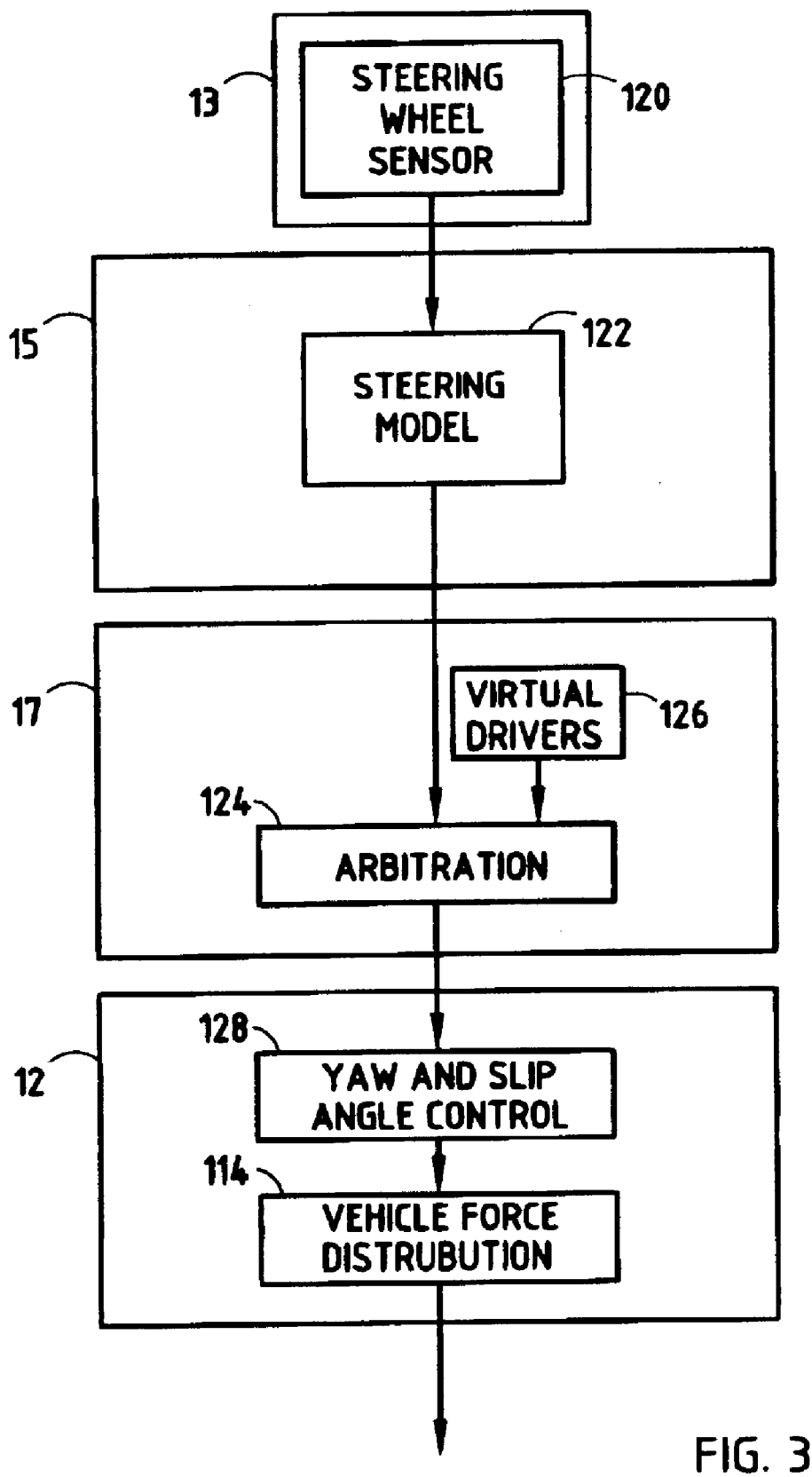
FIG. 3 is a schematic of a portion of the vehicle control system of the present invention showing the internal processes for developing a steering behavior modification demand signal.

FIG. 3 is a schematic of a portion of the vehicle control system of the present invention showing the internal processes for developing the steering behavior modification demand signal. First, the driver input on a steering wheel is measured through a steering wheel sensor 120. The driver input is measured on the steering wheel sensor 120 as at least one of the angle of the steering wheel and the torque of the steering wheel. The steering wheel sensor 120 transfers this information to a steering model block 122 of the driver subsystem 15. Using a reference model in the steering model block 122, the steering model block 122 can determine the driver requests for wheel angles, yaw rate and vehicle slip angle. The steering reference model and the method of determining the desired wheel angles, yaw rate and vehicle slip angle are well known to those skilled in the art. Angles for the front pair or rear pair of wheels can typically only be requested in a steer-by-wire vehicle. The desired wheel angles, yaw rate and vehicle slip angle are sent from the steering model block 122 to a second arbitration block 124 in the active assist subsystem 17. As stated above, the driver subsystem 15 and the active assist subsystem 17 preferably communicate to each other through one node such that all information coming from the driver subsystem 15 is transferred together to the active assist subsystem 17 and for altering the driver subsystem 1.5 alone for adding or removing driver inputs.

The illustrated active assist subsystem 17 includes the second arbitration block 124 and a virtual driver block 126. The virtual driver block 126 includes the portion of the active assist programs that affect the steering or lateral motion of the vehicle. For example, a collision mitigation program will output a signal requesting lateral motion when a radar signal from the environment evaluator 19 tells the program that a side vehicle is too close to the controlled vehicle. The virtual driver block 126 will have an output of required wheel angles, yaw rate and vehicle slip angle (i.e., the at least one active input) to the second arbitration block 124. The second arbitration block 124 will compare the output from the steering model block 122 to the output from the virtual driver block 126 to determine if the driver inputs for steering should be overruled by the output from the virtual driver block 126. For example, the virtual driver block 124 may overrule the steering of the driver of the vehicle for collision mitigation. Therefore, the steering portion of the intended driving demand will be the at least one active input if the at least one active assist program is in the on setting and the at least one active input does not override the at least one driver input. Otherwise, the steering portion of the intended driving demand will be derived from the at least one driver input. As stated above, the active assist subsystem 17 and the vehicle motion control subsystem 12 preferably communicate to each other through one node such that all information coming from the active assist subsystem 17 is transferred together to the vehicle motion control subsystem 12 and for altering the active assist subsystem 17 alone for adding or removing active assist programs.

In the illustrated example, the vehicle motion control subsystem 12 will receive the desired wheel angles, yaw rate and vehicle slip angle from the arbitration block 122 of the active assist subsystem 17. The desired wheel angles, yaw rate and vehicle slip angle are input into a yaw and slip angle control block 128 in the vehicle motion control subsystem 12. The yaw and slip angle control block 128 will compare the requested yaw rate to the actual yaw rate (one of the vehicle state measurements reported from the vehicle state estimator 28) to form a desired yaw moment. In case of four wheel steering, the yaw and slip angle control block 128 will also compare the requested vehicle slip rate to the actual vehicle slip rate (one of the vehicle state measurements reported from the vehicle state estimator 28) to form a desired slip rate that is output as desired wheel angles. The desired yaw moment and the desired wheel angles are output from the yaw and slip angle control block 128 to the vehicle force distribution block 114 in the vehicle motion control subsystem 12. The method of determining the yaw moment and the desired wheel angles are well known to those skilled in the art. The force distribution block 114 translates the desired yaw moment into yaw wheel angles required to achieve the desired yaw moment and combines the yaw wheel angles with the desired wheel angles to form an overall wheel angle request. The force distribution block 114 will also modify the desired wheel angles to accomplish non-lateral demands of the intended driving demand, such as creating a suspension behavior modification through steering (e.g., forcing the vehicle to roll). The overall wheel angle request is the steering behavior modification demand signal.

Figure 4:
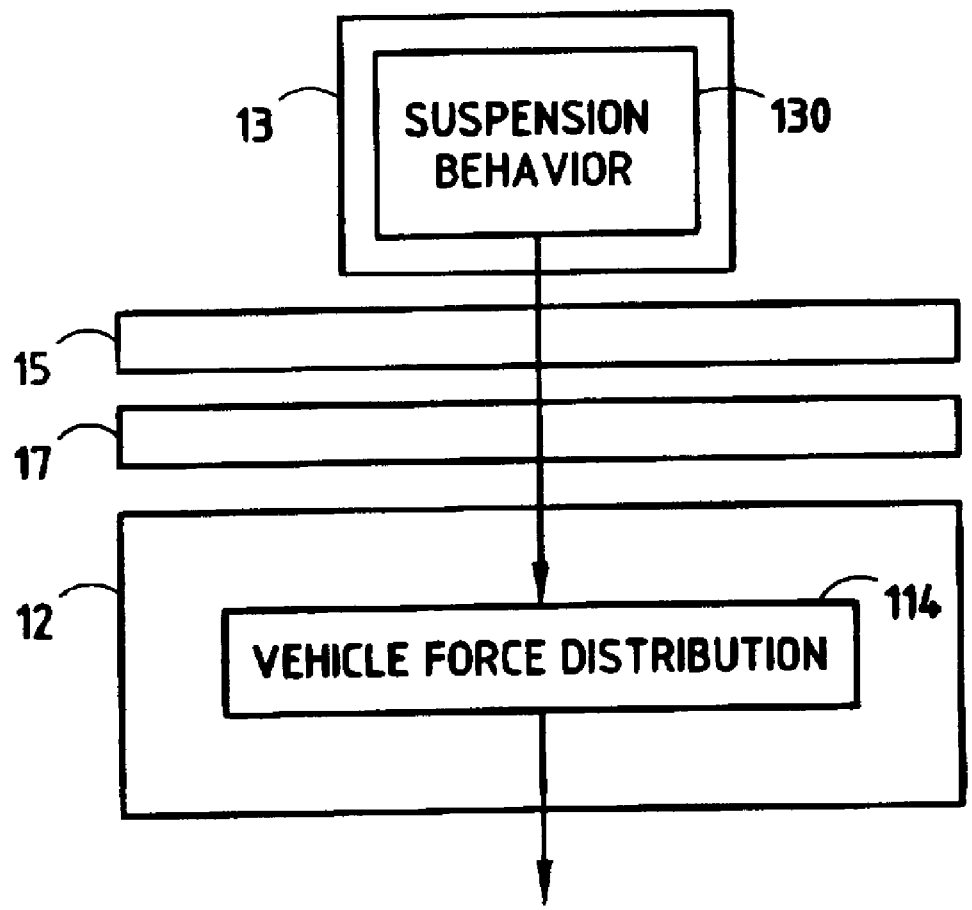
FIG. 4 is a schematic of a portion of the vehicle control system of the present invention showing the internal processes for developing a suspension behavior modification demand signal.

FIG. 4 is a schematic of a portion of the vehicle control system of the present invention showing the internal processes for developing the suspension behavior modification demand signal. The driver typically has no pedal or lever that dynamically controls the suspension behavior of the vehicle, but can request specific suspension behavior 130 of the suspension for certain dynamic events or for the vehicle in any mode (e.g., leveling height or damping mode). Typically, the driver requests a certain operation mode and/or parameter setting for the vehicle that forms the suspension or vertical portion of the intended driving demand 14. In the vehicle motion control subsystem 12, the vehicle force distribution block 114 will use suspension behavior modification programs (e.g., active suspension, electronic stability program, etc.) to modify the vehicle with a roll torque, pitch torque and heave force. The roll torque, pitch torque and heave force are translated into a desired vertical force for each wheel that is output from the vehicle motion control subsystem 12 to the suspension coordination subsystem 22. The force distribution block 114 will also modify the desired vertical force for each wheel to accomplish non-vertical demands of the intended driving demand, such as creating a steering behavior modification through suspension behavior modification (e.g., forcing the vehicle to turn). The requested vertical force on the wheels is the suspension behavior modification demand signal.

Figure 5A:
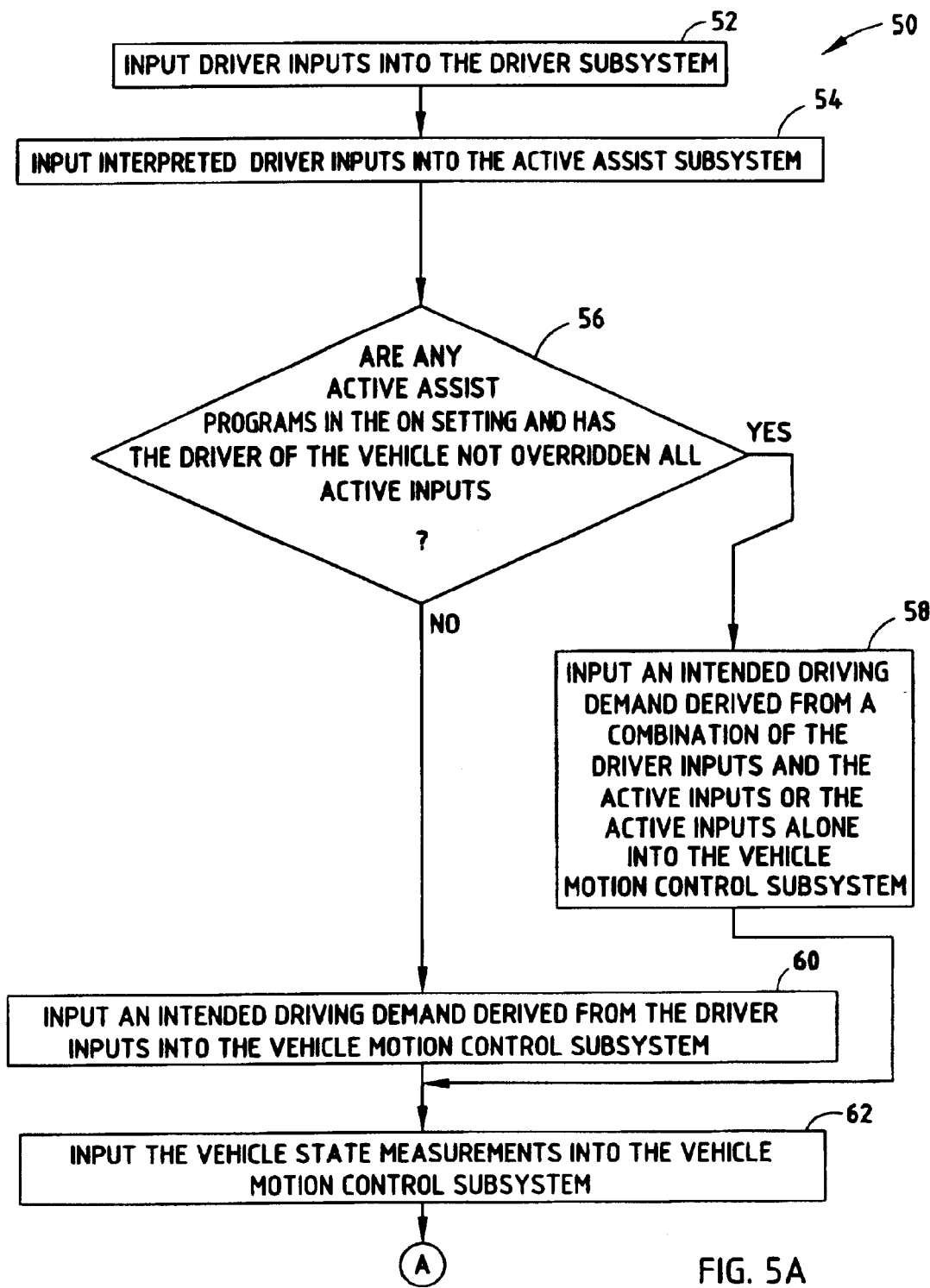
FIGS. 5A and 5B disclose a block diagram illustrating a methodology for controlling a vehicle using the vehicle control system of the present invention.
Figure 5B:
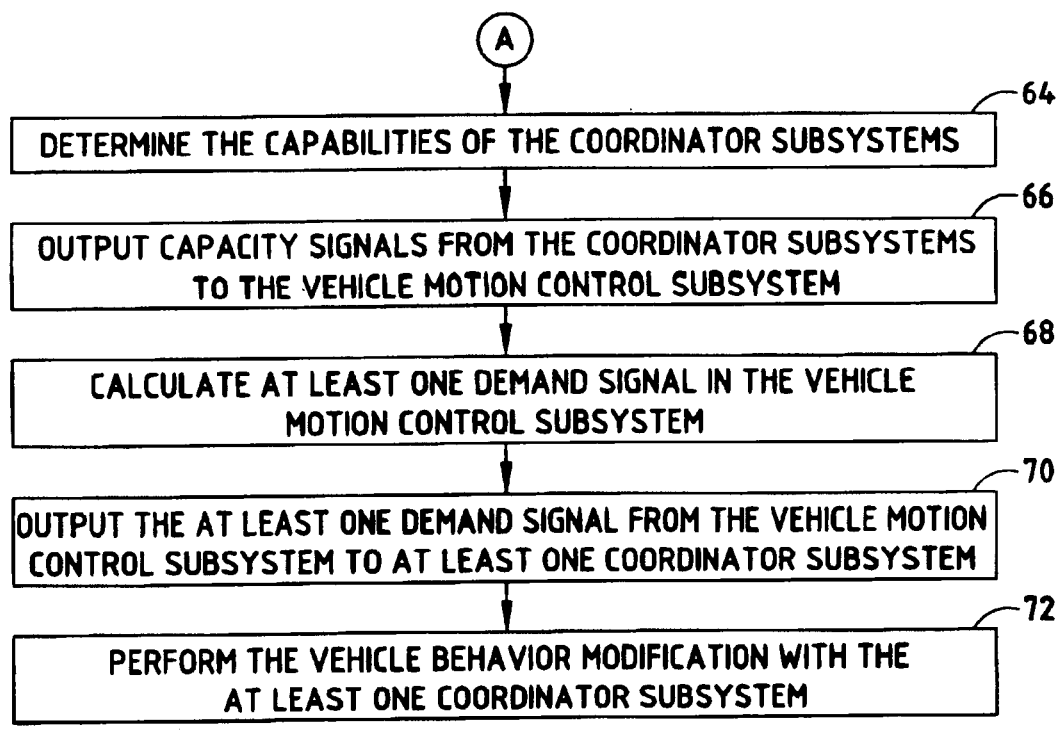

The illustrated vehicle control system of the present invention enhances the performance of the vehicle by distributing commands from the vehicle motion control subsystem 12 to the coordinator subsystems 16 based upon physical capabilities of the actuator control subsystems 26. Referring to FIGS. 5A and 5B, a method 50 of controlling a vehicle with the vehicle control system is shown. Beginning at step 52 of the method 50 of controlling the vehicle, the driver inputs from the driver 11 of the vehicle are inputted into the driver subsystem 15. The driver inputs are processed as discussed above and then sent to the active assist subsystem 17 at step 54.

At this point, the vehicle control system determines if any active assist programs are in the on setting at decision step 56. If the active assist program is in the on setting and the driver of the vehicle does not overrule all active inputs, a combination of the at least one driver input and at least one active input or at least one active input alone defines the intended driving demand 14. Therefore, if the active assist program is in the on setting and the driver of the vehicle does not overrule all active inputs, the intended driving demand 14 defined by either a combination of the driver inputs and active input from the active assist programs or the at least one active input alone is input into the vehicle motion control subsystem 12 at step 58. However, if the active assist program is in the off setting or the driver of the vehicle overrules all active inputs, the driver inputs define the intended driving demand 14. Therefore, if the at least one active assist program is in the off setting and/or the driver of the vehicle overrules the active inputs, the intended driving demand 14 defined by the driver inputs is input into the vehicle motion control subsystem 12 at step 60.

The next three steps in the method of controlling a vehicle occur continuously, even if the intended driving demand 14 is not being input into the vehicle motion control subsystem 12. First, the vehicle state measurements are inputted into the vehicle motion control subsystem 12 from the vehicle state estimator 28 and data therefrom is transferred to each control tier in the vehicle control system at step 62. Second, the coordinator subsystems 16 will determine their capabilities at step 64. As discussed in more detail below, the capabilities of each coordinator subsystem 16 are a combination of all of the capabilities of the actuator control subsystems 26 functionally located under each coordinator subsystem 16 as determined by the data of the vehicle state measurements and measurements from actuator state estimators communicating with each actuator control subsystem 26. For example, a first one of the coordinator subsystems 16 can be the drive train and brakes coordinator subsystem 20 determining that it is capable of providing up to 3.0 Newton meters of braking wheel torque as measured by a combination of the braking wheel torque capabilities of the actuator control subsystems 26 communicating with the drive train and brakes coordinator subsystem 20. Although the drive train and brakes coordinator subsystem 20 is used in the above example, the coordinator subsystems 16 in step 64 could be any of the coordinator subsystems 16. Third, the coordinator subsystems 16 will output their capabilities to the vehicle motion control subsystem 12 at step 66.

After the intended driving demand 14 has been input into the vehicle motion control subsystem 12 at step 58 or 60, the vehicle motion control subsystem 12 will calculate at least one of a first demand signal, a second demand signal and a third demand signal at step 68. The calculation at step 68 is dependent on the capabilities of the first, second and third coordinator subsystems 16. The demand signals to the coordinator subsystems 16 will preferably not demand more from the coordinator subsystems 16 than a particular coordinator subsystem 16 is capable of providing as determined by the capability of the particular coordinator subsystem 16. For example, if the steering coordinator subsystem 18 is only capable of providing 3.0 Newton meters of yaw torque by altering the angles of the wheels and the intended driving demand requires 3.5 Newton meters of yaw torque, the vehicle motion control subsystem 12 will calculate a first demand signal for the steering coordinator subsystem 18 for 3.0 Newton meters (or less) of yaw torque and will send out a second demand signal to the drive train and brakes coordinator 20 requesting 0.5 Newton meters of yaw torque by instructing the drive train and brakes coordinator 20 to brake (braking wheel torque) one side of the vehicle (if possible). Therefore, the vehicle motion control subsystem 12 can output the first demand signal, the second demand signal and/or the third demand signal to the steering coordinator subsystem 18, the drive train and brakes coordinator subsystem 20 and the suspension coordinator subsystem 22, respectively, to accomplish the 3.5 Newton meters of yaw torque. Preferably, the vehicle motion control subsystem 12 will send out demand signals that do not require the coordinator subsystems 16 to perform up to their full capabilities. Therefore, the demand signals sent to each coordinator subsystem 16 will depend on the capabilities of the coordinator subsystem 16 and/or the capabilities of the other coordinator subsystems 16. The demand signal sent to a first coordinator subsystem 16, when more than one demand signal is calculated, will depend on the demand signal sent to a second coordinator subsystem 16, which depends on the capabilities of the second coordinator subsystem 16.

The at least one of the first demand signal, the second demand signal and the third demand signal are then output from the vehicle motion control subsystem 12 to at least one of the first, second and third coordinator subsystems 16, respectively, at step 70. Finally, the at least one of the first, second and third coordinator subsystems 16, via the actuator control subsystems 26, perform the vehicle behavior modification at step 72.

Figure 6:
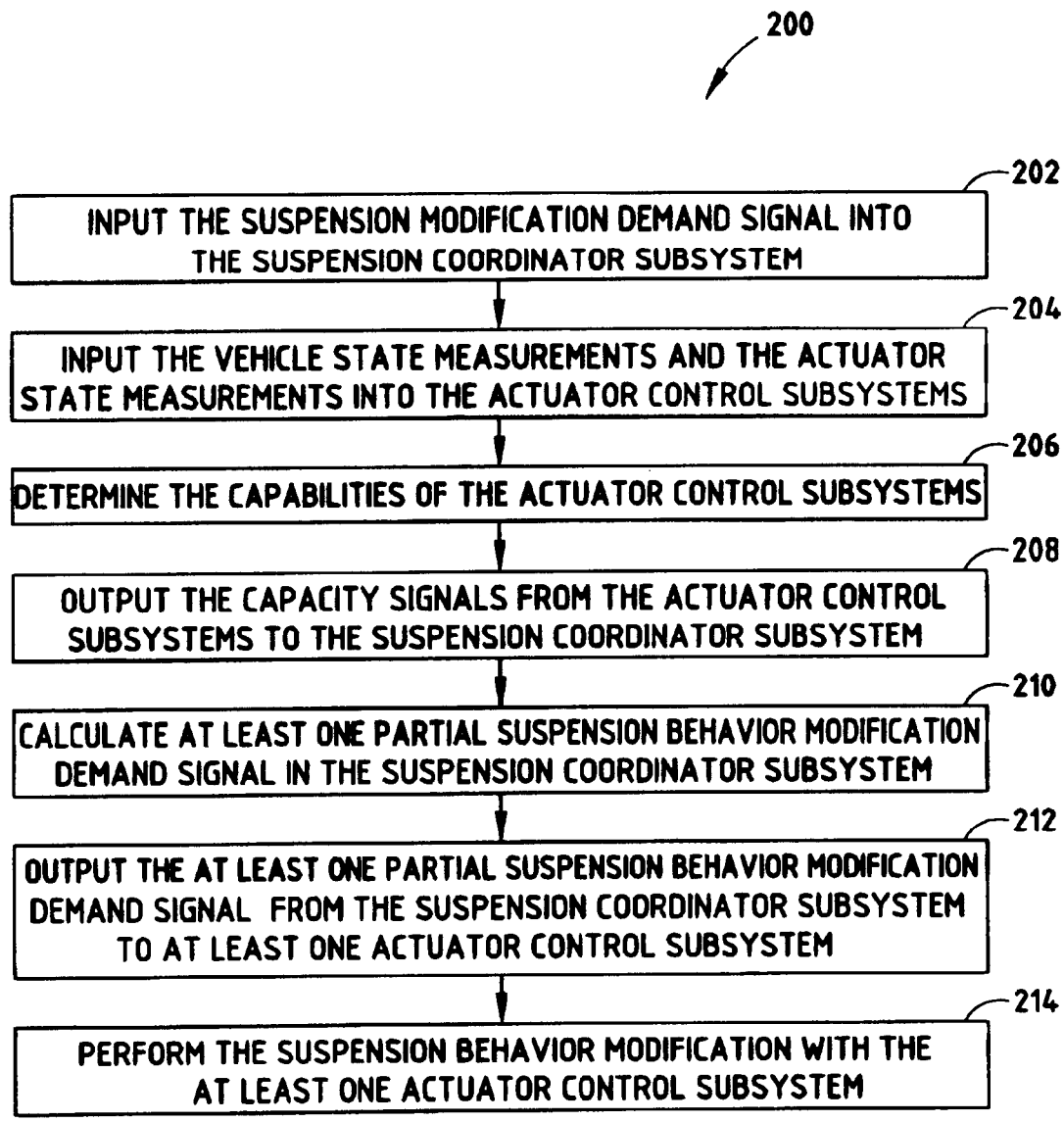
FIG. 6 discloses a block diagram illustrating a methodology for controlling a suspension of the vehicle using a suspension coordinator subsystem of the present invention.

The illustrated suspension coordinator subsystem 22 of the present invention also enhances the performance of the suspension of the vehicle by distributing commands from the suspension coordinator subsystem 22 to the actuator control subsystems 26 functionally located below the suspension coordinator subsystem 22 based upon physical capabilities of the actuator control subsystems 26. Referring to FIG. 6, a method 200 of controlling a suspension of a vehicle with the suspension coordinator subsystem 22 subsystem is shown. Beginning at step 202 of the method 200 of controlling the suspension of the vehicle, the suspension behavior modification demand signal is inputted into the suspension coordinator subsystem 22. The suspension behavior modification demand signal is a signal sent to the suspension coordinator subsystem 22 directing the suspension coordinator subsystem 22 to perform a particular behavior modification of the suspension of the vehicle (i.e., the suspension behavior modification).

The actuator control subsystems 26 receive the vehicle state measurements from the vehicle state estimator 28 (via the motion control subsystem 12 and the suspension coordinator subsystem 22) that provide the state of the vehicle and actuator state measurements from an actuator state estimator that provide the state of the actuators at step 204. As seen in FIG. 1, the vehicle state measurements are preferably transferred to the actuator control subsystems 26 through the vehicle motion control subsystem 12 and the suspension coordinator subsystem 22, although it is contemplated that the vehicle state measurements could be directly inputted into the actuator control subsystems 26. The actuator state measurements are preferably inputted directly into the actuator control subsystems 26. After the vehicle state measurements and actuator state measurements are inputted into the actuator control subsystems 26, the actuator control subsystems 26 will determine their capabilities to perform functions with the vehicle in the state of the vehicle state measurements and actuator state measurements at step 206. The vehicle state measurements are used to determine the capabilities of the actuator control subsystems 26 because the vehicle state measurements will communicate the speed of the vehicle, the movement of the vehicle in six directions, etc. to the actuator control subsystems 26, all of which are used along with the actuator state measurements (which provide the current state of the actuators of and controlled by the actuator control subsystems 26) to determine the capabilities of the actuator control subsystems 26. For example, a first actuator control subsystem 26 can be the leveling control subsystem 46 determining that it is capable of providing up to 3.0 Newtons of vertical force as determined by the load of the vehicle (a vehicle state measurement) and possible air input into an air-suspension level-control system (an actuator state measurement). Although the leveling actuator control subsystem 46 is used in the above example, the actuator control subsystem 26 could be any of the actuator control subsystems 26 under the suspension coordinator subsystem 22. Furthermore, although the step 202 of inputting the suspension behavior modification demand into the suspension coordinator subsystem 22 is shown as occurring before the step 204 of receiving the vehicle state measurements and the actuator state measurements by the first actuator control subsystem 26 and the step 206 of determining the actuator capabilities of the actuator control subsystems 26, steps 204 and 206 can occur simultaneously to or before the step 202 of inputting the suspension behavior modification demand into the suspension coordinator subsystem 22. Preferably, both steps 204 and 206 will occur continuously in the vehicle control system.

After the actuator control subsystems 26 have determined their capabilities, each actuator control subsystem 26 will output a capability signal to the suspension coordinator subsystem 22 communicating the capabilities of each actuator control subsystem 26 at step 208. At this point, the suspension coordinator subsystem 22 will then calculate at least one partial suspension behavior modification demand signal at step 210 (along with combining the capabilities of the actuator control system 26 to form the coordinator capability of the suspension coordinator subsystem 22 for reporting to the vehicle motion control subsystem 12 as discussed above). A first partial suspension behavior modification demand signal will tell a first actuator control subsystem 26 to perform within its first capabilities. Likewise, a second partial suspension behavior modification demand signal will tell a second actuator control subsystem 26 to perform within its second capabilities. Moreover, a third partial suspension behavior modification demand signal will tell a third actuator control subsystem 26 to perform within its third capabilities. Consequently, the first partial suspension behavior modification demand signal, the second partial suspension behavior modification demand signal and/or the third partial suspension behavior modification demand signal will provide directions for a first actuator control subsystem 26, the second actuator control subsystem 26 and/or the third actuator control subsystem 26, respectively, to perform the suspension behavior modification of the suspension behavior modification demand signal. Furthermore, the first partial suspension behavior modification demand signal, the second partial suspension behavior modification demand signal and the third partial suspension behavior modification demand signal are therefore calculated according to the first capabilities of the first actuator control subsystem 26, the second capabilities of the second actuator control subsystem 26 and/or the third capabilities of the third actuator control subsystem 26. For example, if the suspension behavior modification demand signal requires more from a single actuator control subsystem than it is capable of providing (as determined by its capabilities), more than one partial suspension behavior modification demand signal will be calculated, with a first partial suspension behavior modification demand signal being determined according to the capabilities of a first actuator control system (i.e., requesting the first actuator control system to perform within its capabilities) and a second partial suspension behavior modification demand signal that depends on the capabilities of the first actuator control subsystem (a suspension behavior modification demand of the suspension behavior modification demand signal remaining after the first partial suspension behavior modification demand signal is removed).

At this point, the at least one of the first partial suspension behavior modification demand signal, the second partial suspension behavior modification demand signal and the third partial suspension behavior modification demand signal are output from the suspension coordinator subsystem 22 to at least one of the first, second and third actuator control subsystems 26, respectively, at step 212. Finally, the at least one of the first, second and third actuator control subsystems 26 perform the suspension behavior modification at step 214. Although only three actuator control subsystems 26 are disclosed in the illustrated method 200 of controlling the suspension of the vehicle with the suspension coordinator controller 22 and the vehicle control system, it is contemplated that any number of actuator control subsystems 26 could be used.

Figure 7:
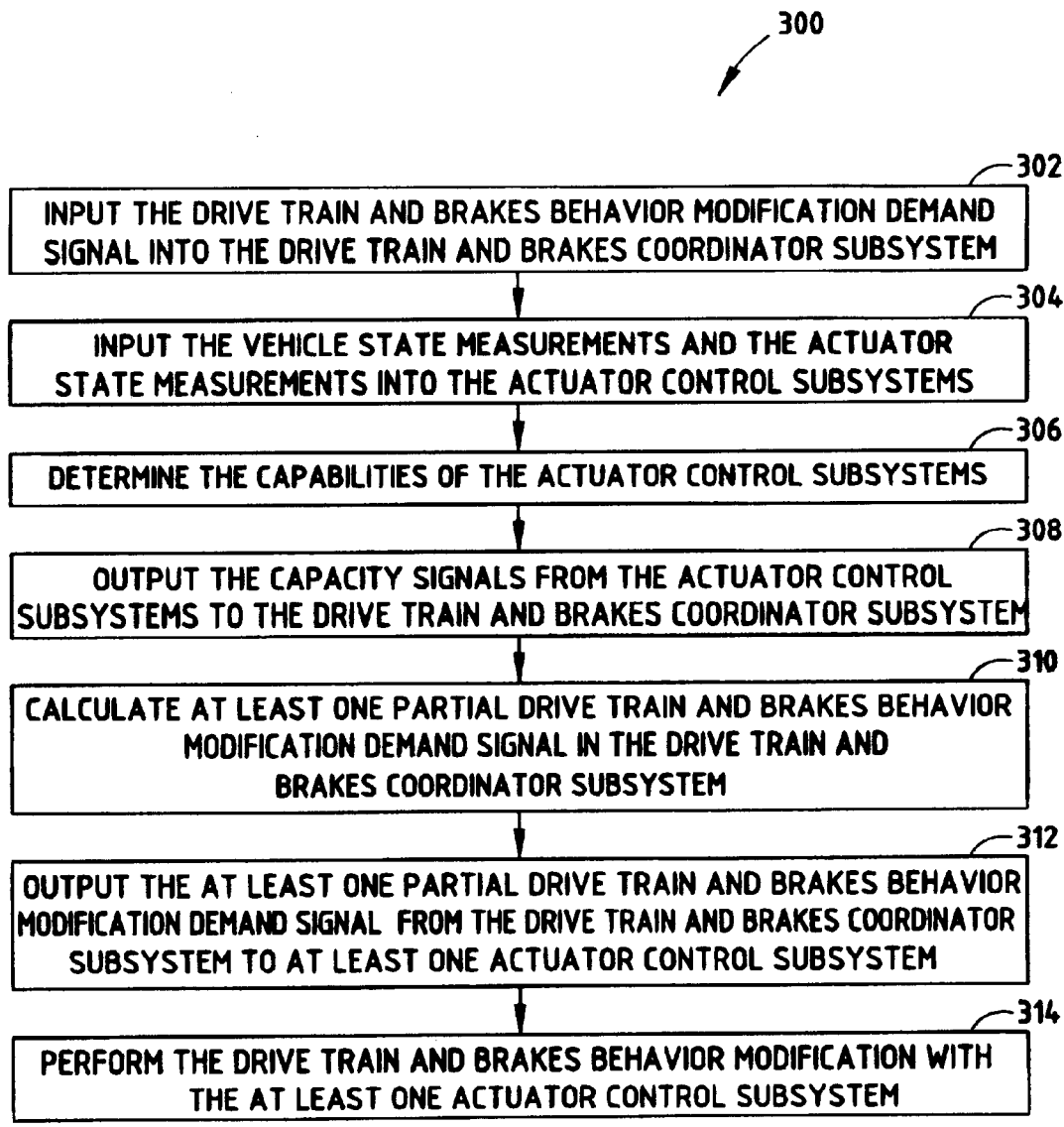
FIG. 7 discloses a block diagram illustrating a methodology for controlling drive train and brakes of the vehicle using a drive train and brakes coordinator subsystem of the present invention.

The illustrated drive train and brakes coordinator subsystem 22 of the present invention also enhances the performance of the drive train and brakes of the vehicle by distributing commands from the drive train and brakes coordinator subsystem 22 to the actuator control subsystems 26 based upon physical capabilities of the actuator control subsystems 26 functionally located below the drive train and brakes coordinator subsystem 22. Referring to FIG. 7, a method 300 of controlling a drive train and brakes of a vehicle with the drive train and brakes coordination 22 subsystem is shown. Beginning at step 302 of the method 300 of controlling the drive train and brakes of the vehicle, the drive train and brakes behavior modification demand signal is inputted into the drive train and brakes coordinator subsystem 22. The drive train and brakes behavior modification demand signal is a signal sent to the drive train and brakes coordinator subsystem 22 directing the drive train and brakes coordinator subsystem 22 to perform a particular behavior modification of the drive train and brakes of the vehicle (i.e., the drive train and brakes behavior modification).

The actuator control subsystems 26 receive the vehicle state measurements from the vehicle state estimator 28 (via the motion control subsystem 12 and the drive train and brakes coordinator subsystem 22) that provide the state of the vehicle and actuator state measurements from an actuator state estimator that provide the state of the actuators at step 304. As seen in FIG. 1, the vehicle state measurements are preferably transferred to the actuator control subsystems 26 through the vehicle motion control subsystem 12 and the drive train and brakes coordinator subsystem 22, although it is contemplated that the vehicle state measurements could be directly inputted into the actuator control subsystems 26. The actuator state measurements are preferably inputted directly into the actuator control subsystems 26. After the vehicle state measurements and actuator state measurements are inputted into the actuator control subsystems 26, the actuator control subsystems 26 will determine their capabilities to perform functions with the vehicle in the state of the vehicle state measurements and actuator state measurements at step 306. The vehicle state measurements are used to determine the capabilities of the actuator control subsystems 26 because the vehicle state measurements will communicate the speed of the vehicle, the movement of the vehicle in six directions, etc. to the actuator control subsystems 26, all of which are used along with the actuator state measurements (which provide the current state of the actuators of and controlled by the actuator control subsystems 26) to determine the capabilities of the actuator control subsystems 26. For example, a first actuator control subsystem 26 can be the engine control subsystem 36 determining that it is capable of providing up to 3.0 Newton meters of wheel torque as determined by the speed of the vehicle (a vehicle state measurement) and possible fuel input into an engine (an actuator state measurement). Although the engine control subsystem 36 is used in the above example, the actuator control subsystem 26 could be any of the actuator control subsystems 26 under the drive train and brakes coordinator subsystem 22. Furthermore, although the step 302 of inputting the drive train and brakes behavior modification demand into the drive train and brakes coordinator subsystem 22 is shown as occurring before the step 304 of receiving the vehicle state measurements and the actuator state measurements by the first actuator control subsystem 26 and the step 306 of determining the actuator capabilities of the actuator control subsystems 26, steps 304 and 306 can occur simultaneously to or before the step of inputting the drive train and brakes behavior modification demand into the drive train and brakes coordinator subsystem 22. Preferably, both steps 304 and 306 will occur continuously in the vehicle control system.

After the actuator control subsystems 26 have determined their capabilities, each actuator control subsystem 26 will output a capability signal to the drive train and brakes coordinator subsystem 22 communicating the capabilities of each actuator control subsystem 26 at step 308. At this point, the drive train and brakes coordinator subsystem 22 will then calculate at least one partial drive train and brakes behavior modification demand signal at step 310 (along with combining the capabilities of the actuator control system 26 to form the coordinator capability of the drive train and brakes coordinator subsystem 22 for reporting to the vehicle motion control subsystem 12 as discussed above). A first partial drive train and brakes behavior modification demand signal will tell a first actuator control subsystem 26 to perform within its first capabilities. Likewise, a second partial drive train and brakes behavior modification demand signal will tell a second actuator control subsystem 26 to perform within its second capabilities. Moreover, a third partial drive train and brakes behavior modification demand signal will tell a third actuator control subsystem 26 to perform within its third capabilities. Consequently, the first partial drive train and brakes behavior modification demand signal, the second partial drive train and brakes behavior modification demand signal and/or the third partial drive train and brakes behavior modification demand signal will provide directions for a first actuator control subsystem 26, the second actuator control subsystem 26 and/or the third actuator control subsystem 26, respectively, to perform the drive train and brakes behavior modification of the drive train and brakes behavior modification demand signal. Furthermore, the first partial drive train and brakes behavior modification demand signal, the second partial drive train and brakes behavior modification demand signal and the third partial drive train and brakes behavior modification demand signal are therefore calculated according to the first capabilities of the first actuator control subsystem 26, the second capabilities of the second actuator control subsystem 26 and the third capabilities of the third actuator control subsystem 26. For example, if the drive train and brakes behavior modification demand signal requires more from a single actuator control subsystem than it is capable of providing (as determined by its capabilities), more than one partial drive train and brakes behavior modification demand signal will be calculated, with a first partial drive train and brakes behavior modification demand signal being determined according to the capabilities of a first actuator control system (i.e., requesting the first actuator control system to perform within its capabilities) and a second partial drive train and brakes behavior modification demand signal that depends on the capabilities of the first actuator control subsystem (a drive train and brakes behavior modification demand of the drive train and brakes behavior modification demand signal remaining after the first partial drive train and brakes behavior modification demand is removed).

At this point, the at least one of the first partial drive train and brakes behavior modification demand signal, the second partial drive train and brakes behavior modification demand signal and the third partial drive train and brakes behavior modification demand signal are output from the drive train and brakes coordinator subsystem 22 to at least one of the first, second and third actuator control subsystems 26, respectively, at step 312. Finally, the at least one of the first, second and third actuator control subsystems 26 perform the drive train and brakes behavior modification at step 314. Although only three actuator control subsystems 26 are disclosed in the illustrated method 300 of controlling the drive train and brakes of the vehicle with the drive train and brakes coordinator controller 22 and the vehicle control system, it is contemplated that any number of actuator control subsystems 26 could be used.

The vehicle control system or any component thereof (e.g., each subsystem or subsystems grouped together) may include a general-purpose microprocessor-based controller, and may include a commercially available off-the-shelf controller. The vehicle control system or component thereof preferably includes a processor and memory for storing and processing software algorithms which processes inputs and provides output control signals. Preferably, all components (of a certain size) of the vehicle control system 10 are divided among the available electronic control units in the vehicle based on available memory, calculation power, bus capacity, safety requirements, etc. It is further noted that all steps shown in FIGS. 5A–7 are preferably repeatedly executed, possibly at different communications frequencies.

Although the illustrated vehicle control system is illustrated as being an integral unit, the subsystems of the vehicle control system can be used in combination with other subsystems not disclosed herein. For example, the driver subsystem 15, the active assist subsystem 17 and the vehicle motion control subsystem 12 can be used with any implementation subsystem, wherein the implementation subsystem handles the function of implementing the commands from the vehicle motion control subsystem. Furthermore, the driver subsystem 15 and the active assist subsystem 17 can be used with any vehicle control and implementation subsystem, wherein the vehicle control and implementation subsystem receives the intended driving demand 14 from the active assist subsystem 17 and implements the intended driving demand 14 with the vehicle. Likewise, the vehicle motion control subsystem 12, the coordinator subsystems 16 and the actuator control subsystems 26 can be used to implement any intended driving demand 14 coming directly from the driver and/or active assist programs or from anywhere else. Finally, each of the coordinator subsystems 16 can be used separately or in combination with subsystems varying from those disclosed herein. Further combinations will be readily apparent to those skilled in the art.

It will be readily appreciated by those skilled in the art that modifications may be made to the invention without departing from the concepts disclosed herein. The controllers can be interconnected via a service data bus of the vehicle or are hard-wired together. Furthermore, the controllers could be implemented in any of a number of microprocessor based controllers. While digital controllers are described herein, it should be appreciated that the controllers could alternatively be in analog circuitry. Such modifications are to be considered as included in the following claims, unless these claims by their language expressly state otherwise.

What is claimed is:

1. A method of controlling a vehicle with a vehicle motion control subsystem comprising:

inputting an intended driving demand to the vehicle motion control subsystem, the intended driving demand requesting a vehicle behavior modification;

inputting vehicle state measurements into a first coordinator subsystem;

determining first capabilities of the first coordinator subsystem with regard to the vehicle state measurements;

outputting a first capability signal from the first coordinator subsystem to the vehicle motion control subsystem, the first capability signal communicating the first capabilities of the first coordinator subsystem;

calculating a first demand signal and at least one of a second demand signal and a third demand signal; and outputting the first demand signal from the vehicle motion control subsystem to the first coordinator subsystem and the at least one of the second demand signal and the third demand signal to at least one of a second coordinator subsystem and a third coordinator subsystem;

wherein both the first demand signal and the at least one of the second demand signal and the third demand signal are calculated according to the first capabilities of the first coordinator subsystem; and wherein the first demand signal and the at least one of the second demand signal and the third demand signal provide directions for the first coordinator subsystem and the at least one of the second coordinator subsystem and the third coordinator subsystem, respectively, to perform the vehicle behavior modification of the intended driving demand.

2. The method of controlling a vehicle of claim 1, wherein:

the first, second and third coordinator subsystems include a suspension coordinator subsystem, a steering coordinator subsystem and a drive train and brakes coordinator subsystem.

3. The method of controlling a vehicle of claim 2, further including:

controlling a suspension of the vehicle with the suspension coordinator subsystem;

controlling steering of the vehicle with the steering coordinator subsystem; and controlling a drive train and brakes of the vehicle with the drive train and brakes coordinator subsystem.

4. The method of controlling a vehicle of claim 1, further including:

inputting vehicle state measurements into the second coordinator subsystem;

determining second capabilities of the second coordinator subsystem with regard to the vehicle state measurements; and outputting a second capability signal from the second coordinator subsystem to the vehicle motion control subsystem, the second capability signal communicating the second capabilities of the second coordinator subsystem.

5. The method of controlling a vehicle of claim 4, wherein:

both the first demand signal and the at least one of the second demand signal and the third demand signal are also calculated according to the second capabilities of the second coordinator subsystem.

6. The method of controlling a vehicle of claim 1, wherein:

the step of outputting the first demand signal and at least one of the second demand signal and the third demand signal comprises outputting the first demand signal from the vehicle motion control subsystem to the first coordinator subsystem, outputting the second demand signal from the vehicle motion control subsystem to the second coordinator subsystem and outputting the third demand signal from the vehicle motion control subsystem to the third coordinator subsystem; and wherein the first demand signal, the second demand signal and the third demand signal provide directions for the first coordinator subsystem, the second coordinator subsystem and the third coordinator subsystem, respectively, to perform the vehicle behavior modification of the intended driving demand.

7. The method of controlling a vehicle of claim 6, further including:

inputting vehicle state measurements into the second coordinator subsystem;

determining second capabilities of the second coordinator subsystem with regard to the vehicle state measurements; and outputting a second capability signal from the second coordinator subsystem to the vehicle motion control subsystem, the second capability signal communicating the second capabilities of the second coordinator subsystem.

8. The method of controlling a vehicle of claim 7, wherein:

the first demand signal, the second demand signal and the third demand signal are also calculated according to the second capabilities of the second coordinator subsystem.

9. A vehicle control system comprising:

a vehicle motion control subsystem having a system input and a system output, the system input communicating an intended driving demand to the vehicle motion control subsystem, the intended driving demand requesting a vehicle behavior modification; and a first coordinator subsystem having a first subsystem input and a first subsystem output, the first subsystem input receiving vehicle state measurements; and at least one of a second coordinator subsystem having a second subsystem input and a third coordinator subsystem having a third subsystem input;

wherein the first coordinator subsystem determines first capabilities of the first coordinator subsystem with regard to the vehicle state measurements;

wherein the first subsystem output of the first coordinator subsystem communicates the first capabilities of the first coordinator subsystem to the system input of the vehicle motion control subsystem;

wherein the vehicle motion control subsystem calculates a first demand signal and at least one of a second demand signal and a third demand signal, both the first demand signal and the at least one of the second demand signal and the third demand signal being calculated according to the first capabilities of the first coordinator subsystem;

wherein the vehicle motion control subsystem outputs the first demand signal to the first coordinator subsystem and at least one of the second demand signal and the third demand signal to at least one of the second subsystem input and the third subsystem input of the second coordinator subsystem and the third coordinator subsystem, respectively; and wherein the first demand signal and the at least one of the second demand signal and the third demand signal provide directions for the first coordinator subsystem and the at least one of the second coordinator subsystem and the third coordinator subsystem, respectively, to perform the vehicle behavior modification of the intended driving demand.

10. The vehicle control system of claim 9, wherein:
the first, second and third coordinator subsystems include a suspension coordinator subsystem, a steering coordinator subsystem and a drive train and brakes coordinator subsystem.

11. The vehicle control system of claim 10, wherein:
the suspension coordinator subsystem controls a suspension of the vehicle;
the steering coordinator subsystem controls steering of the vehicle; and
the drive train and brakes coordinator subsystem controls a drive train and brakes of the vehicle.

12. The vehicle control system of claim 9, wherein:
the at least one of the second coordinator subsystem and a third coordinator subsystem comprises the second coordinator subsystem;
the second coordinator subsystem determines second capabilities of the second coordinator subsystem with regard to the vehicle state measurements;
the second coordinator subsystem includes a second subsystem output, the second subsystem output of the second coordinator subsystem communicating the second capabilities of the second coordinator subsystem to the system input of the vehicle motion control subsystem;
the at least one of the second demand signal and the third demand signal comprises the second demand signal; and both the first demand signal and the second demand signal are also calculated according to the second capabilities of the second coordinator subsystem.

13. The vehicle control system of claim 9, further including:
inputting vehicle state measurements into the second coordinator subsystem;
determining second capabilities of the second coordinator subsystem with regard to the vehicle state measurements; and
outputting a second capability signal from the second coordinator subsystem to the vehicle motion control subsystem, the second capability signal communicating the second capabilities of the second coordinator subsystem.

14. The vehicle control system of claim 13, wherein:
the first demand signal, the second demand signal and the third demand signal are also calculated according to the second capabilities of the second coordinator subsystem.

15. A method of controlling a vehicle with a vehicle motion control subsystem comprising:
inputting an intended driving demand to the vehicle motion control subsystem, the intended driving demand requesting a vehicle behavior modification;
determining first capabilities of a first coordinator subsystem, second capabilities of a second coordinator subsystem, and third capabilities of a third coordinator subsystem;
outputting a first capability signal from the first coordinator subsystem to the vehicle motion control subsystem, a second capability signal from the second coordinator subsystem to the vehicle motion control subsystem and a third capability signal from the third coordinator subsystem to the vehicle motion control subsystem, the first capability signal communicating the first capabilities of the first coordinator subsystem, the second capability signal communicating the second capabilities of the second coordinator subsystem and the third capability signal communicating the third capabilities of the third coordinator subsystem;
calculating at least one demand signal with the vehicle motion control subsystem according to at least one of the first capabilities of the first coordinator subsystem, the second capabilities of the second coordinator subsystem and the third capabilities of the third coordinator subsystem; and
outputting the at least one demand signal from the vehicle motion control subsystem to at least one coordinator subsystem;
wherein the at least one demand signal provides directions for the at least one coordinator subsystem to perform the vehicle behavior modification of the intended driving demand.

16. The method of controlling a vehicle of claim 15, wherein:
the first, second and third coordinator subsystems include a suspension coordinator subsystem, a steering coordinator subsystem and a drive train and brakes coordinator subsystem.

17. The method of controlling a vehicle of claim 16, further including:
controlling a suspension of the vehicle with the suspension coordinator subsystem;
controlling steering of the vehicle with the steering coordinator subsystem; and controlling a drive train and brakes of the vehicle with the drive train and brakes coordinator subsystem.

18. The method of controlling a vehicle of claim 15, further including:

inputting vehicle state measurements into the first coordinator subsystem, the second subsystem and the third coordinator subsystem;

wherein the step of determining first capabilities of a first coordinator subsystem, second capabilities of a second coordinator subsystem, and third capabilities of a third coordinator subsystem includes determining the first capabilities, second capabilities and third capabilities with regard to the vehicle state measurements.

19. The method of controlling a vehicle of claim 18, wherein:

the step of calculating at least one demand signal comprises calculating at least two demand signals.

20. The method of controlling a vehicle of claim 19, wherein:

the step of calculating at least two demand signals with the vehicle motion control subsystem according to at least one of the first capabilities of the first coordinator subsystem, the second capabilities of the second coordinator subsystem and the third capabilities of the third coordinator subsystem comprises calculating at least two demand signals with the vehicle motion control subsystem according to at least two of the first capabilities of the first coordinator subsystem, the second capabilities of the second coordinator subsystem and the third capabilities of the third coordinator subsystem.

* * * * *

UNITED STATES PATENT AND TRADEMARK OFFICE
CERTIFICATE OF CORRECTION

PATENT NO. : 6,622,074 B1  
DATED : September 16, 2003  
INVENTOR(S) : Erik Coelingh et al.

Page 1 of 1

It is certified that error appears in the above-identified patent and that said Letters Patent is hereby corrected as shown below:

Drawings,
Figure 1A, "Front-Wheel Steering Control Subsystem 20" should be -- Front-Wheel Steering Control Subsystem 30 --.
"Rear-Wheel Steering Control Subsystem 22" should be -- Rear-Wheel Steering Control Subsystem 32 --.

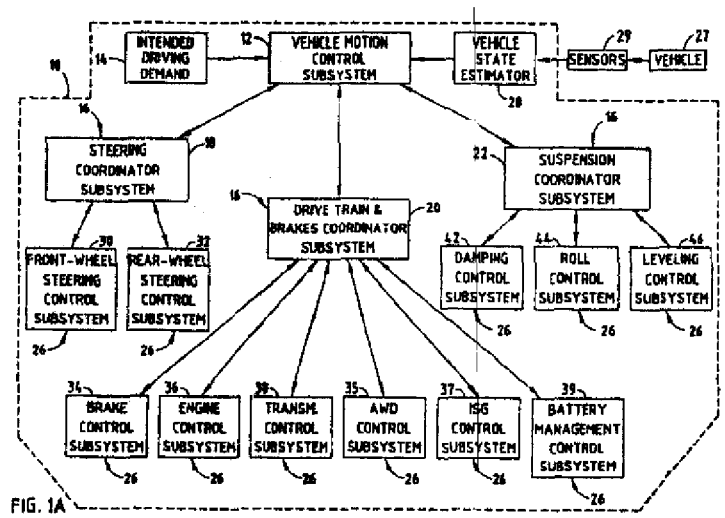

Signed and Sealed this

Twelfth Day of April, 2005

JON W. DUDAS  
*Director of the United States Patent and Trademark Office*